March 15, 1927.

J. W. THROPP

MAGNETIC CLUTCH

Filed June 29, 1923

Inventor
Joseph W. Thropp
by his Attorneys

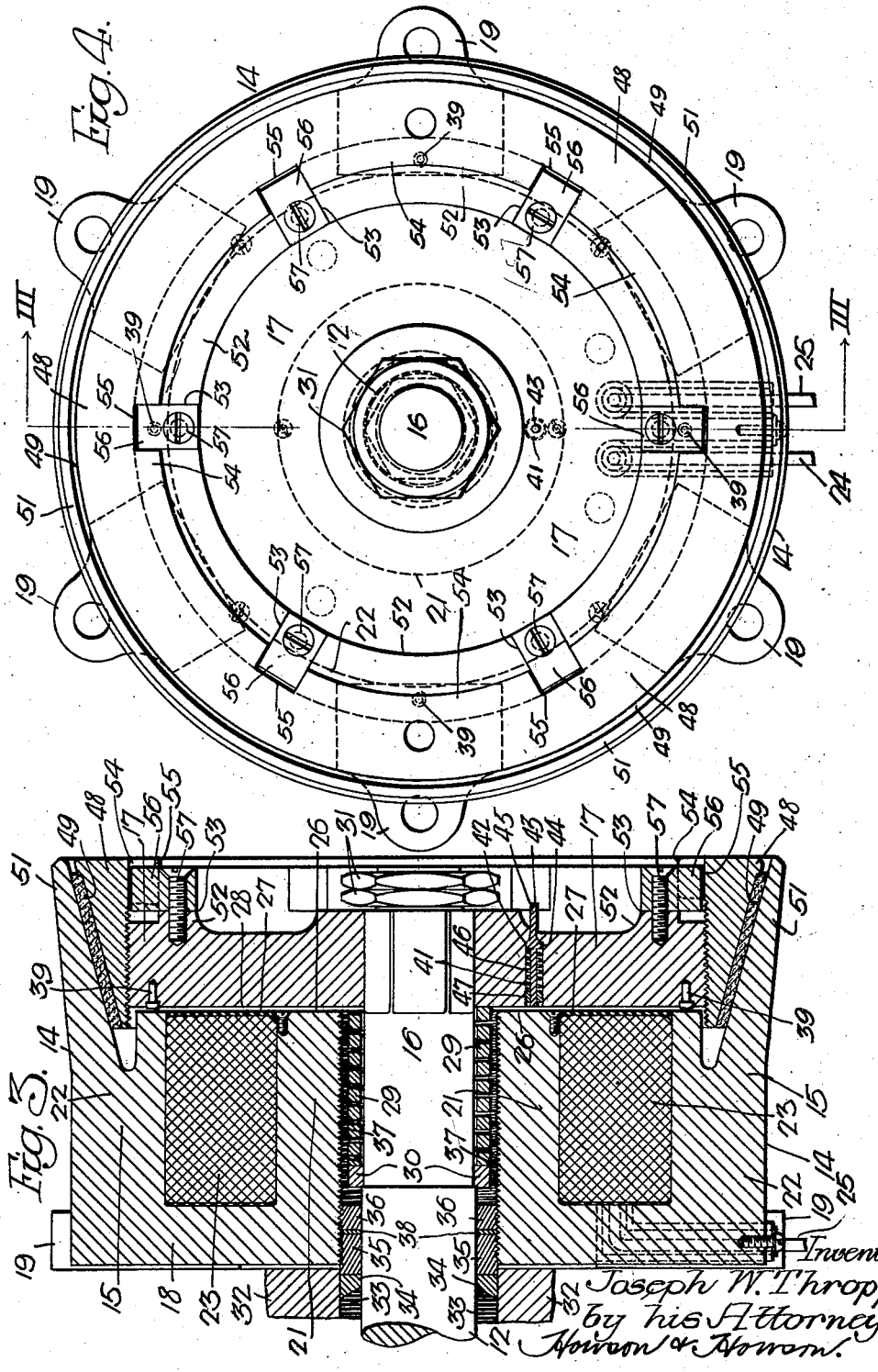

March 15, 1927. 1,621,383
J. W. THROPP
MAGNETIC CLUTCH
Filed June 29, 1923  3 Sheets-Sheet 3
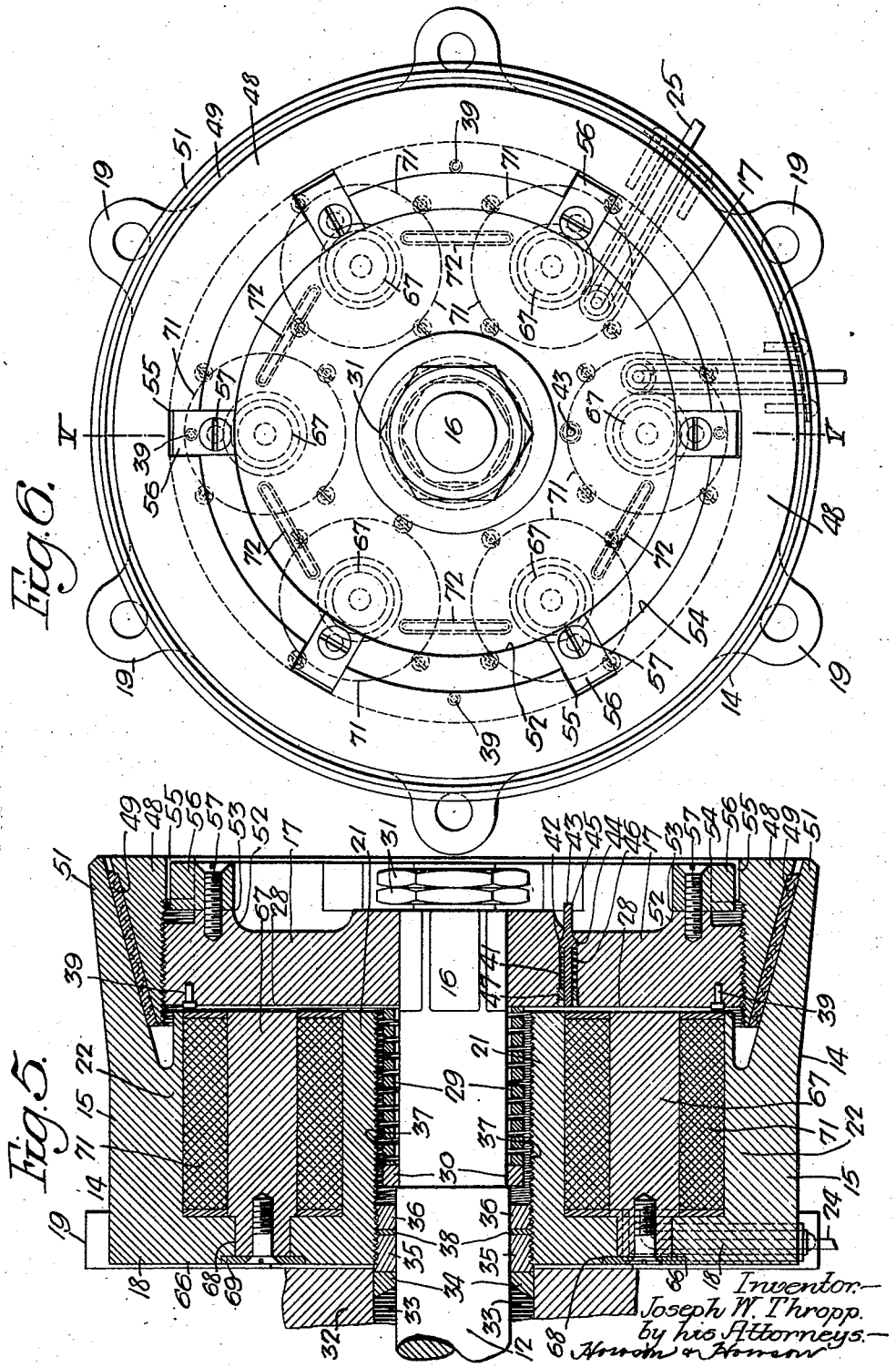

Patented Mar. 15, 1927.

1,621,383

UNITED STATES PATENT OFFICE.

JOSEPH W. THROPP, OF TRENTON, NEW JERSEY.

MAGNETIC CLUTCH.

Application filed June 29, 1923. Serial No. 648,525.

My invention relates to power transmission systems, having particular relation to magnetic mechanisms designed for interconnecting such systems.

The invention is particularly applicable to a power transmission system of the type set forth in my co-pending application for power transmission system, Serial No. 731,890, filed Aug. 13, 1924. In the same application, I have set forth and claimed the power transmission system as an entirety, and it will be understood that this present application relates particularly to the magnetic clutch forming a part of the same system.

One object of my invention is to provide a magnetic clutch, wherein the motion of the armature toward and away from the field piece of the clutch, which obtains during the application and release of the clutch mechanism, may be limited to a predetermined degree.

A further object of my invention is to provide a gauge tester for indicating, at will, the air-gap between the relatively movable armature and field members, constituting elements of the clutch mechanism.

With these and other objects and applications in view, my invention further consists in the nature, the mode of operation, and the details of construction hereinafter described and claimed and illustrated in the accompanying drawings, wherein:

Fig. 3 is an enlarged longitudinal sectional view of one of the magnetic clutches shown in Fig. 1, the sectional plane being indicated by the line III—III of Fig. 4;

Fig. 4 is a front elevational view of the structure of Fig. 3;

Fig. 5 is a view similar to Fig. 3, but showing an alternative construction, the sectional plane being taken on the line V—V of Fig. 6; and Fig. 6 is a front elevational view of the structure of Fig. 5.

Figure 1:
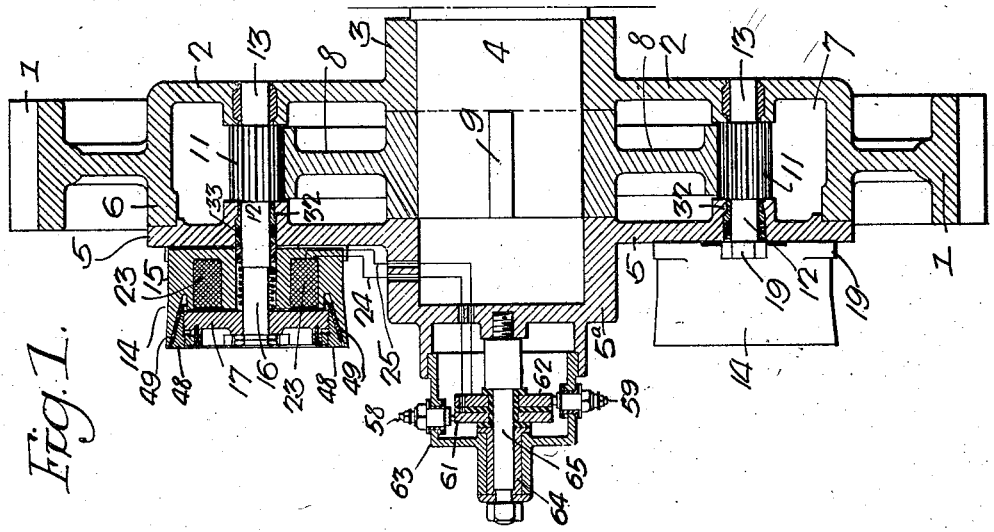
Fig. 1 is a longitudinal sectional view of one embodiment of my invention.
Figure 2:
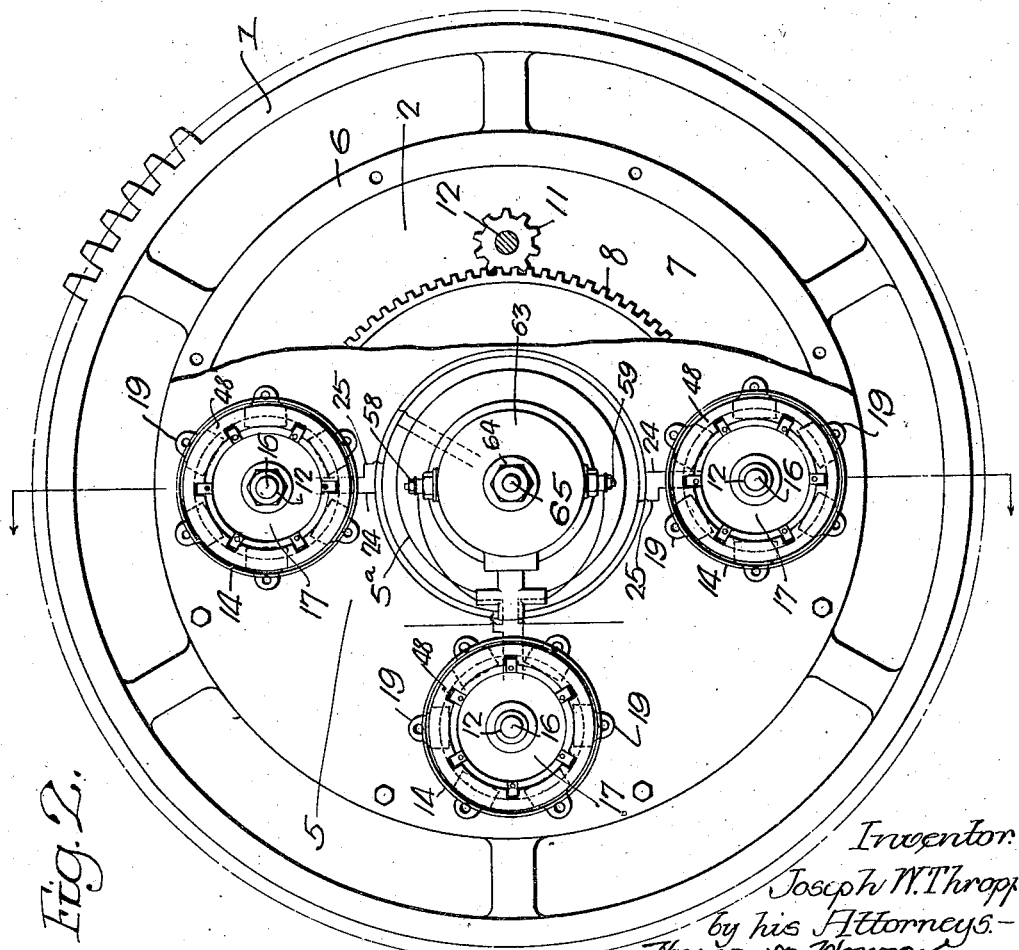
Fig. 2 is a front elevational view of the structure of Fig. 1, a portion of the power-transmitting member being broken away.

In the illustrated form of embodiment of my invention, shown in the drawing, a gear-wheel or so-called "power-transmission mechanism" 1 is provided with a web 2 and a hub 3, the latter being loosely mounted on a driving shaft 4. The web 2 is provided with a complementarily arranged web portion 5 having a hub portion $5^a$ in axial alignment with the driving shaft 4. The web portion 5 is secured, at the peripheral edge thereof, to a flange portion 6 extending from said web portion 2 forming a closed annular space 7.

A gear-wheel 8 is positioned in the annular space 7 and it is rigidly secured to the driving shaft 4 through a key 9. A plurality of pinions 11 are provided with trunnions 12 and 13 which are respectively journaled in the web portions 2 and 5 in such manner that the pinions 11 and the gear wheel 8 intermesh, thereby forming a so-called "sun and planet" gear-wheel mechanism. Inasmuch as the pinions 11 are free to revolve, the operation of the gear wheel 8 does not effect a corresponding operation of the power-transmitting element 1. However, when the pinions 11 are locked with respect to the driving gear wheel 8, the operation of the latter effects a corresponding operation of the power-transmitting element 1. In the drawings is shown one means for locking the pinions 11 and effecting, at will, the interconnection of the driving shaft 4 and the power-transmitting element 1, comprising a magnetic clutch mechanism 14.

The magnetic clutch mechanism 14 comprises a field member 15, which is mounted about a projecting shaft portion 16 of the trunnion 12 and secured to the web 5, and a longitudinally movable armature member 17 carried on the end of said shaft portion 16 and adapted to effect the locking of the pinions 11, all as hereinafter more fully described.

The field member 15 comprises an annular magnetizable base member 18 having perforated lug portions 19 providing for the securing of the same to the web 5 by screw bolts. The base portion 18 is further provided with projecting annular flanges 21 and 22 forming spaced inner and outer cylinders, the projecting shaft portion 16 of the trunnion 12 extending through the inner cylinder 21 and a magnetizing winding 23 having terminal connections 24 and 25 positioned in said annular space. The free ends of the cylindrical flanges 21 and 22 are in alignment and constitute a so-called "pole face 26." The sides of the magnetizing coil 23, immediately adjacent to the pole face 26, may be protected by a non-magnetizable cover member 27.

The armature member 17, which is provided with a surface 28 co-extensive with that of the pole face 26, may be slidably mounted on the end of the projecting shaft portion 16 for motion to and from the pole face 26, by cutting the shaft in the form of a hexagon and correspondingly forming the contacting armature surface. The adjacent armature and pole surfaces 26 and 28, respectively, may be normally forced apart by means of a spring member 29 concentrically mounted about the projecting shaft portion 16 and having one end engaging the movable armature member 17 and the other a collar 30 which is rigidly secured to the projecting shaft portion 16. The end of the projecting shaft portion 16 beyond the armature member 17 is threaded to receive a pair of nuts 31 which are designed to prevent the spring 29 from forcing the armature 17 off the projecting shaft portion 16.

The bearing for the trunnion 12 which is formed in the end plate 5, comprises a bearing element 32 constituting an abutment, a packing 33, a packing ring 34 and clamping and locking nuts 35 and 36, respectively, which are secured in threaded engagement with a threaded cylindrical surface 37 of the flange 21. An element 38 may be employed to space the clamping and locking nuts 35 and 36, respectively.

In practical operation, I have observed that it is highly desirable to prevent the armature surface 28 from contacting with the pole face 26, inasmuch as the armature member 17 becomes magnetized and thereby decreases the magnetic force between the field and armature members 15 and 17, respectively. This difficulty has been overcome in my invention by providing a plurality of spaced pins 39 of brass or other non-magnetizable material in the armature surface 28.

I have further found that it is very important, at times, to ascertain the extent of the air-gap between the pole face 26 and the armature face 28, and in Fig. 3 is shown one arrangement for accomplishing the same, wherein the armature member 17 is provided with a perforation 41, which extends from a portion of the armature face 28 preferably opposite the end of one of the concentric cylinders, say 21, to the outer side thereof, the perforation 41 being restricted near the outer side to provide a shoulder portion 42. A gauge pin 43 having a shoulder portion 44 engaging the shoulder 42 and also having a handle portion 45, which extends beyond the outer side of the armature member 17, is resiliently held in the position just specified by means of a spring member 46 having one end engaging the gauge-pin shoulder 44 and the other end engaging a member 47 secured in threaded engagement with the inner surface of the armature perforation 41, as shown in Fig. 3 of the drawing. In operation, the air-gap between the pole face 26 and the adjacent armature face 28 is determined by observing the distance which it is necessary to move the gauge pin 43 before it contacts with the pole face 26.

A cylindrical member 48 is secured in threaded engagement with the armature member 17, the outer surface thereof being conical in form and having rigidly secured thereto a friction lining 49. The cylindrical flange member 22 may be extended to form a projecting portion 51 having an inner conical surface conforming to that of the member 48 and thereby constituting the remaining element of the clutch mechanism. The threaded engagement of the members 48 and 17 provides for such adjustment of the contacting surfaces of the clutch mechanism as may be desired. The clutch element 48 may be locked to the armature member 17 in certain predetermined positions by providing the armature 17 with an outwardly extending flange 52 having transversely extended slots 53, and by providing the member 48 with an inwardly extending flange 54 having complementarily arranged slots 55 for key members 56. The key members 56 may be removably secured in position by means of screw members 57 extending through the same and engaging threaded holes in the armature member 17. Thus one of the elements is carried by the armature member 17, while the other is mounted in fixed relation to the magnet, so that both elements will be located outside of the field of magnetic action.

In operation, when energy is supplied to the magnetizing winding 23 of the magnetic clutch 14, the cooperating clutch surfaces, which are normally held out of frictional engagement by the force of the spring 29, are actuated into frictional engagement with one another by the force of attraction between the field member 15 and the armature member 17, thereby resulting in the locking of the projecting portion 16 of the pinion trunnion 12 and the field piece 15.

Currents may be supplied to the conductors 24 and 25 which are connected to the magnetizing winding 23, through a pair of stationary contact elements 58 and 59, Fig. 1, which cooperate with slip-ring elements 61 and 62, respectively. The stationary contact elements 58 and 59 are rigidly secured to a stationary cylindrical casing 63 having one end thereof forming a journal box 64. The slip rings 61 and 62 are carried by a shaft 65 having one end journaled in the bearing box 64 and the other end secured to the hub portion 6 of the web plate 5.

In the operation of the power-transmission system shown in the drawings, when the magnetizing winding 23 is deenergized and the frictional contacting surfaces of the clutch mechanism are held out of engagement by the force of the spring 29, the pinions 11 and the gear wheel 8 turn idly, as in the usual "sun and planet" gear wheel mechanism. Hence, there is no transfer of power from the driving gear wheel 8 to the power transmitting element 1.

As hereinbefore stated, when current is supplied to the magnetizing winding 23, however, the force of attraction between the field piece 15 and the armature member 17 overcomes that of the spring 29, resulting in the engagement of the cooperating frictional clutch surfaces and the consequent locking of the pinions 11. When the gear wheel 8 is now rotated, the power transmission element 1 is rigidly secured to the driving shaft 4 permitting a transfer of power from one to the other.

In Figs. 5 and 6 is shown an alternative field construction 66, wherein a plurality of polar projections 67 are positioned in the space intermediate the flanges 21 and 22 and are secured at their inner ends in perforations 68 formed in the base 18 of the field construction 66 by clamping-plate construction 69. The polar projections 67 may be energized by magnetizing windings 71.

The windings 71 are connected in series-circuit relation by connectors 72 in such manner that successive polar projections are oppositely magnetized. When such condition obtains, the magnetic flux passes from the end of one polar projection through the air-gap between itself and the armature 17, thence through the armature 17 and the air-gap between itself and the end portion of the next succeeding polar projection, to the end portion of said succeeding polar projection. The flux is thus caused to traverse a circuit which reduces to a minimum the tendency for the magnetic flux to traverse the leakage path through the shaft 10. The operation and construction of the apparatus of Figs. 5 and 6 is otherwise the same as that for the preceding figures.

While I have described a specific form of my invention in detail and while I have pointed out certain of the most obvious principles and purposes and details of construction thereof, I do not intend that the language employed in the following claims shall be limited to the precise features described, but I intend that the claims shall be construed to cover all combinations which are literally included in the language thereof, when read in connection with the prior art regardless of the details and functions mentioned in the description or illustrated in the drawing.

I claim:

1. In combination, a shaft, a field piece comprising a magnetizable member and a magnetizing winding concentrically mounted about said shaft, said field piece having one end adapted to serve as a pole face, an armature member slidably mounted on said shaft in such manner as to be movable toward and away from said pole face, two friction elements, one carried by the armature member and one mounted in relatively fixed position, and spacing members supplemental to the friction elements for limiting the forward movement of said armature member.

2. In combination, a shaft, a field piece comprising a magnetizable member and a magnetizing winding concentrically mounted about said shaft, said field piece having one end adapted to serve as a pole face, an armature member slidably mounted on said shaft in such manner as to be movable toward and away from said pole face, two friction elements, one carried by the armature member and one mounted in relatively fixed position, and non-magnetizable spacing members supplemental to the friction elements carried by said armature for preventing contact between the latter member and said pole face.

3. The combination of a rotatable shaft, an armature member splined on each shaft, an electro-magnet surrounding the shaft and adapted to act upon the armature member to move it in one direction along the shaft, a spring engaging the shaft independently of the magnet and tending to move the armature member along the shaft in the direction opposite to that aforesaid, means carried by the shaft for limiting the last said movement, and annular friction elements adapted to be brought into engagement by the first said movement of the armature member, one of the said elements being carried by the armature member and the other being mounted in fixed relation to the magnet and both of the said elements being located outside of the field of magnetic action.

4. The combination of a rotatable shaft, an armature member splined on the shaft, an electro-magnet surrounding the shaft and adapted to act upon the armature member to move it in one direction along the shaft, a spring engaging the shaft independently of the magnet and tending to move the armature member along the shaft in the direction opposite to that aforesaid, axially adjustable means carried by the shaft for limiting the last said movement, and annular friction elements adapted to be brought into engagement by the first said movement of the armature member, one of the said elements being carried by the armature member and the other being mounted in fixed relation to the magnet and both of the said elements being located outside of the field of magnetic action.

5. The combination of a rotatable shaft, an armature member splined on the shaft, an electro-magnet surrounding the shaft and adapted to act upon the armature member to move it in one direction along the shaft, a spring in the annular space between the magnet and the shaft and tending to move the armature member along the shaft in the direction opposite to that aforesaid, axially adjustable means carried by the shaft for limiting the last said movement, and annular friction elements adapted to be brought into engagement by the first said movement of the armature member, one of the said elements being carried by the armature member and the other being mounted in fixed relation to the magnet and both of the said elements being located outside of the field of magnetic action.

6. The combination of a rotatable shaft, an armature member splined on the shaft, an electro-magnet surrounding the shaft and adapted to act upon the armature member to move it in one direction along the shaft, a spring engaging the shaft independently of the magnet and tending to move the armature member along the shaft in the direction opposite to that aforesaid, means carried by the shaft for limiting the last said movement, annular friction elements adapted to be brought into engagement by the first said movement of the armature member, one of the said elements being carried by the armature member and the other being mounted in fixed relation to the magnet and both of the said elements being located outside of the field of magnetic action, and means for effecting axial adjustment between the armature member and the friction element carried thereby so as to change the frictional engagement without changing the relation between the armature member and the magnet.

7. In combination, an electro-magnet comprising a field piece having a pole face and a cooperating armature member, a shaft for rotating said armature member, the latter being slidably mounted on said shaft for motion toward and away from said field piece, a cylindrical member threaded to said armature member, the outer surface thereof being conical in form and constituting one element of a clutch mechanism, said field piece having projecting means forming a coöperating clutch element, the surface of said armature member opposite said pole face being provided with a projecting ring formed with transversely extending slots, the cylindrical member being provided with an inwardly extending flange, engaging said projecting ring and provided with slots registering with the slots of the ring, and key members positioned in said registering slots.

8. The combination of a rotatable shaft, an armature member splined on the shaft, an electro-magnet adapted to act upon the armature member to move it in one direction along the shaft, a spring engaging the shaft and tending to move the armature member in one direction along the shaft in the direction opposite to that aforesaid, annular friction elements adapted to be brought into engagement by the first said movement of the armature member, one of the said elements being carried by the armature member and the other being mounted in fixed relation to the magnet, means supplemental to the friction elements for limiting the first said movement of the armature member, and means for determining the air-gap between the armature member and the field piece of the said magnet.

9. In combination, an electro-magnet comprising a field piece having a pole face and a cooperating armature member, a shaft for rotating said armature member, the latter being slidably mounted on said shaft for motion toward and away from said field piece, a ring having its inner surface in threaded engagement with said armature member and its outer surface in the form of a cone constituting one element of a clutch mechanism, said field piece being extended to form a cooperating element for the clutch mechanism, means supplemental to the said clutch elements for limiting the longitudinal movement of said armature member, and means for determining, at will, the air-gap between said field piece and said armature member.

10. In combination, an electro-magnet comprising a field piece having a pole face and a cooperating armature member, a shaft for rotating said armature member, the latter being slidably mounted on said shaft for motion toward and away from said field piece, a ring having its inner surface in threaded engagement with said armature member and its outer surface in the form of a cone constituting one element of a clutch mechanism, said field piece being extended to form a cooperating element for the clutch mechanism, means supplemental to the same clutch elements for limiting the axial movement of said armature member, and a rod resiliently mounted on said armature member for indicating the air-gap between the latter member and the pole face.

JOSEPH W. THROPP.